(12) United States Patent
Maier et al.

(10) Patent No.: US 12,510,221 B2
(45) Date of Patent: Dec. 30, 2025

(54) SIGNAL LIGHT OR ILLUMINATION DEVICE WITH MULTI-SECTION LIGHT GUIDING BODY

(71) Applicant: ZKW Group GmbH, Wieselburg (AT)

(72) Inventors: Christian Maier, Oberndorf an der Melk (AT); Patrick Rappersberger, St. Pölten (AT); Michal Tomecek, Hlučín (CZ); Christian Müllauer, Frankenfels (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/909,556

(22) Filed: Oct. 8, 2024

(65) Prior Publication Data

US 2025/0116383 A1 Apr. 10, 2025

(30) Foreign Application Priority Data

Oct. 9, 2023 (EP) ..................................... 23202470

(51) Int. Cl.
*F21S 41/24* (2018.01)
*F21S 41/25* (2018.01)
(Continued)

(52) U.S. Cl.
CPC .............. *F21S 41/24* (2018.01); *F21S 41/25* (2018.01); *F21S 41/322* (2018.01); *F21S 43/239* (2018.01); *F21S 43/26271* (2024.05)

(58) Field of Classification Search
CPC ...... F21S 43/239; F21S 43/245; F21S 43/249; F21S 41/24; F21S 41/25; F21S 41/322
See application file for complete search history.

(56) References Cited

U.S. PATENT DOCUMENTS

| 9,599,308 B2* | 3/2017 | Ender | F21S 43/239 |
| 2016/0138772 A1* | 5/2016 | Sato | F21S 43/40 362/511 |

(Continued)

FOREIGN PATENT DOCUMENTS

| DE | 202021100910 U1 | 3/2021 |
| DE | 10202112001 A1 | 2/2023 |

(Continued)

OTHER PUBLICATIONS

Extended European Search Report for European Patent Application No. 23202470.3 dated Feb. 20, 2024 (9 Pages).

*Primary Examiner* — Tracie Y Green
*Assistant Examiner* — Michael Chiang
(74) *Attorney, Agent, or Firm* — Eversheds Sutherland (US) LLP

(57) ABSTRACT

Signal light or illumination device for a motor vehicle or for a motor vehicle headlight, comprising a light source, a light guiding body associated with the light source, wherein the light guiding body has a first section, a second section, and a first deflection element, wherein the first section is designed as a first light guiding channel and the second section is designed as a second light guiding channel, wherein the first deflection element connects the first section to the second section in a light-guiding manner, wherein the first light guiding channel has optical structures, which are designed to deflect light rays entering the first light channel, wherein the deflection by the optical structures is such that deflected light illuminates deflection elements of the second section substantially uniformly in such a way that light exiting the second section has a constant light intensity.

26 Claims, 4 Drawing Sheets

(51) Int. Cl.
  *F21S 41/32*   (2018.01)
  *F21S 43/20*   (2018.01)
  *F21S 43/239*  (2018.01)

(56) References Cited

U.S. PATENT DOCUMENTS

2024/0093853 A1* 3/2024 Mahel .................... F21S 43/241
2024/0343185 A1* 10/2024 Tassy ...................... B60Q 3/74
2024/0359620 A1* 10/2024 Tassy .................... G02B 6/0073
2025/0093009 A1* 3/2025 Muegge ................ F21S 43/241

FOREIGN PATENT DOCUMENTS

| EP | 1684002  | A2 |   | 7/2006 |              |
|----|----------|----|---|--------|--------------|
| EP | 2354637  | A2 |   | 8/2011 |              |
| EP | 3862624  | A1 | * | 8/2021 | ... F21S 41/24 |
| FR | 3126361  | A1 |   | 3/2023 |              |
| FR | 3126745  | A1 |   | 3/2023 |              |

* cited by examiner

SIGNAL LIGHT OR ILLUMINATION DEVICE WITH MULTI-SECTION LIGHT GUIDING BODY

CROSS-REFERENCE TO RELATED APPLICATIONS

This application claims priority to European Patent Application No. 23202470.3, filed Oct. 9, 2023, which is incorporated herein by reference.

FIELD OF THE INVENTION

The invention relates to a signal light or illumination device for a motor vehicle or for a motor vehicle headlight, comprising:
  at least one light source for emitting light rays,
  a light guiding body associated with the at least one light source, wherein the light guiding body is designed to receive light from the at least one light source via a light entry area of the light guiding body, to guide it through the light guiding body and couple it out at a light extraction area of the light guiding body along a main emission direction,
wherein the light guiding body has a first section, a second section, and a first deflection element,
wherein the first section is designed as a first light guiding channel, which is delimited by a first outer surface and has a first longitudinal extension, wherein the first section is preferably designed in such a way that its first longitudinal extension runs along the main emission direction, wherein the light entry area is formed at an end of the first section facing the at least one light source, wherein the light entry area is designed in such a way, for example in the form of a collimator, that the light rays emitted by the at least one light source after entering the first section are parallelized parallel to a first plane, and in particular are not parallelized along a second plane which is different from the first plane, preferably orthogonal to the first plane, and propagate along the main emission direction through the first section,
wherein the second section is designed as a second light guiding channel, which is delimited by a second outer surface and has a second longitudinal extension, wherein the second section is oriented to the first section in such a way that its second longitudinal extension runs along a second direction, which is oriented differently from the main emission direction, wherein the second outer surface has a rear side and a front side opposite the rear side, wherein the rear side has second deflection elements along the second longitudinal extension at least in sections, which are designed to deflect light, which propagates inside the second section and strikes the second deflection elements, in the direction of the front side, wherein one section of the front side preferably opposite the second deflection elements forms the light extraction area, via which light deflected by the second deflection elements exits the second section of the light guiding body, for example as a signal light function,
wherein the first deflection element connects the first section to the second section in a light-guiding manner and is designed to deflect light that has entered the first section, after it has passed through the first section, into the second section, in particular by means of total reflection, such that deflected light propagates inside the second section along the second direction.

The invention further relates to a motor vehicle or a motor vehicle headlight, comprising a signal light or illumination device.

BACKGROUND

Signal light or illumination devices (hereinafter referred to as device), which are formed from a plurality of (optically active) sections, are known in the prior art. It is often necessary, for example due to a predetermined installation position of the optically active components of the device, to arrange the various sections in a certain geometry in relation to one another, which in turn may require multiple light deflections within the device in order to achieve a certain light propagation path between a light entry area and a light extraction area within the device. However, when light is deflected from one section to the next section, there is the disadvantage that light intensity is "lost" or cannot be uniformly transferred from one section to the next section. This usually results in unevenly illuminated exit surfaces in the last sections, from which the light is emitted as a lighting function.

The object of the present invention consists in mitigating or eliminating the disadvantages of the prior art. The objective of the invention is therefore in particular to create a signal light or illumination device, in which the uniformity of the light emitted by the signal light or illumination device is increased.

This object is achieved by a signal light or illumination device having the features of claim 1. Preferred embodiments are specified in the dependent claims.

SUMMARY OF THE INVENTION

According to the invention, the first outer surface of the first light guiding channel has optical structures along the first longitudinal extension of the first section at least in sections, which are designed to deflect light rays that have entered via the light entry area,
wherein the deflection by the optical structures is such that light deflected by the optical structures, after it has been deflected by the first deflection element in the direction of the second section, illuminates the second deflection elements of the second section substantially uniformly in such a way that light exiting the extraction area of the second section has a substantially constant light intensity per exit surface unit over the entire extraction area.

This has the advantage that light deflected from the first section to the second section is emitted from the second section homogeneously or uniformly over the exit surface. This means that the light extraction area of the light guiding body can be perceived as a uniformly brightly illuminated surface. As a result of the optical structures, the light can be more parallel along the light emission direction within the first section than in the absence of the optical structures. If, for example, a light ray is totally reflected several times along the first section at optical structures, the angle between the light ray and the optical axis can be further reduced with each reflection, whereby the light ray along the first longitudinal extension of the first section aligns more and more with the main emission direction or is parallelized towards the main emission direction.

It can be provided that the optical structures are designed to deflect light rays in such a way that light rays reflected by the optical structures have an angle to the main emission direction which is smaller than an angle, which would exist between the main emission direction and light rays, which would be reflected by a notional, smooth or flat outer surface, which is free of optical structures. In other words, after they have been deflected or totally reflected by the optical structures, light rays are "more parallel" to the main emission direction than prior to deflection by the optical structures.

It can be provided that the first section is oriented to the second section in such a way that the first longitudinal extension of the first section and the second longitudinal extension of the second section form an obtuse angle, wherein in particular the angle is more than 90°, and preferably smaller than 160°, wherein the first deflection element is preferably arranged on an end of the first section facing away from the at least one light source.

It can be provided that the second deflection elements are cylindrical, wherein their cylinder axes extend on the rear side orthogonal to the main emission direction, and extend in particular orthogonal to the second longitudinal extension or to the second direction, wherein the cylindrical second deflection elements are designed to deflect light, which propagates inside the second section and strikes the cylindrical second deflection elements, in the direction of the front side, wherein the cylindrical second deflection elements and the light extraction area are preferably designed in such a way that the deflected light rays are oriented parallel to the main emission direction after exiting the second section.

It can be provided that the second deflection elements are designed as a plurality of deflection prisms, which are arranged in a, preferably rectangular, grid on the rear side, wherein each deflection prism has a deflection surface designed to deflect light, preferably by means of total reflection, and at least one side surface, in particular two side surfaces, wherein the deflection prisms are preferably designed in such a way that the surface areas of the deflection surfaces increase along the second longitudinal extension and the at least one side surface is preferably oriented parallel to the second longitudinal extension or to the second direction, wherein the deflection prisms are preferably designed in such a way that their deflection surfaces respectively have a certain angle of inclination to a virtual rear side plane, which follows the rear side, wherein the rear side plane is oriented parallel to the second longitudinal extension, wherein the angles of inclination increase along the second longitudinal extension in such a way that light rays deflected by the deflection prisms are oriented parallel to one another along the entire second longitudinal extension after they have been deflected at the deflection surfaces. In particular, light rays which propagate within the second section can strike the rear surface (or the deflection surfaces) at different angles relative to the second longitudinal extension or relative to the rear side plane. With the angles of inclination of the deflection prisms increasing along the second longitudinal extension as described here, the light rays deflected by the deflection prisms and exiting the second section can be oriented parallel to one another and in particular parallel to the main emission direction. Furthermore, thanks to the surface areas of the deflection surfaces increasing along the second longitudinal extension, the same luminous flux or a constant light intensity can be emitted over the entire light extraction area (or light exit surface) of the second section.

It can be provided that the first outer surface of the first section has an upper side and a lower side opposite the upper side, wherein the optical structures are arranged on the upper side and/or the lower side.

It can be provided that the optical structures are designed as third deflection elements, for example as a plurality of deflection prisms or stepped deflection structures, which are arranged along a section of the outer surface along the main emission direction and are preferably arranged at regular intervals or directly adjacent to one another on the outer surface, wherein the third deflection elements preferably have respectively one, in particular flat, deflection surface for the deflection, in particular for the total reflection, of light, wherein the deflection surfaces of the third deflection elements have in particular a transverse extension orthogonal to the main emission direction, wherein each deflection surface of a third deflection element is preferably inclined to the main emission direction.

It can be provided that the second section is oriented to the first section in such a way that the rear side of the second outer surface faces the at least one light source and the front side of the second outer surface faces away from the at least one light source.

It can be provided that the first section and the second section are respectively plate-like, wherein a length and a width of the first section lie in the plane which is parallel to the main emission direction, and a height of the first section lies in the second plane which is oriented orthogonal to the plane, wherein the second section preferably extends along the second longitudinal extension starting from an end face of the plate-like first section facing away from the light source.

It can be provided that the first deflection element is designed for total reflection, in particular as a totally reflecting mirror, and is designed to deflect the light that has passed through the first section into the second section, preferably fully.

It can be provided that the first section is designed integrally with the second section, wherein the first section is connected in a light-guiding manner to the second section via a connection section of the light guiding body, wherein the connection section has the first deflection element.

It can be provided that the first section and the second section are designed as light-guiding, preferably transparent, solid bodies.

It can be provided that the first section and the second section are designed and oriented to one another in such a way that light propagates in the first section along the main emission direction, and, after having been deflected by the first deflection element, light propagates in the second section along a deflection direction, which forms an obtuse angle with the main emission direction, wherein the deflection direction is oriented along the second longitudinal extension, wherein the second section is designed in such a way that light exiting the light extraction area of the second section is oriented parallel to the main emission direction.

It can be provided that the main emission direction lies in a horizontal plane when the signal light or illumination device is fitted to a motor vehicle or in a motor vehicle headlight.

It can be provided that the signal light or illumination device has a plurality of light sources arranged one next to the another along a width, which is oriented orthogonal to the main emission direction, wherein the light entry area of the first section has a plurality of collimators, wherein a light source is associated with each collimator.

It can be provided that the signal light or illumination device comprises a scattering element, preferably a diffusing lens, which is arranged along the main emission direction downstream of the second section, wherein the scattering element has a light entry surface facing the light extraction area of the second section and a light exit surface facing away from the light extraction area of the second section, wherein the scattering element is designed to receive light exiting the light extraction area of the second section via the light entry surface and emit it as scattered, preferably diffuse, light via the light exit surface.

It can be provided that the first plane is orthogonal to the second plane, wherein the first plane and the second plane are respectively oriented parallel to the main emission direction. It can be provided that, when the signal light or illumination device is fitted to a motor vehicle or in a motor vehicle headlight, the first plane is a horizontal plane and the second plane is a vertical plane, wherein in particular the main emission direction can be parallel to a point of intersection of the horizontal plane with the vertical plane.

According to a second aspect of the invention, a motor vehicle or motor vehicle headlight is provided, comprising a signal light or illumination device.

BRIEF DESCRIPTION OF THE DRAWINGS

The invention is outlined in more detail below based on a preferred exemplary embodiment, to which it is, however, not limited: In the (schematic) drawings.

In the context of this description, the terms "above", "below", "horizontal", "vertical" should be understood as indications of orientation when the signal light or illumination device is arranged in its normal position of use after having been fitted to a motor vehicle headlight or to a motor vehicle.

DETAILED DESCRIPTION

Figure 1:
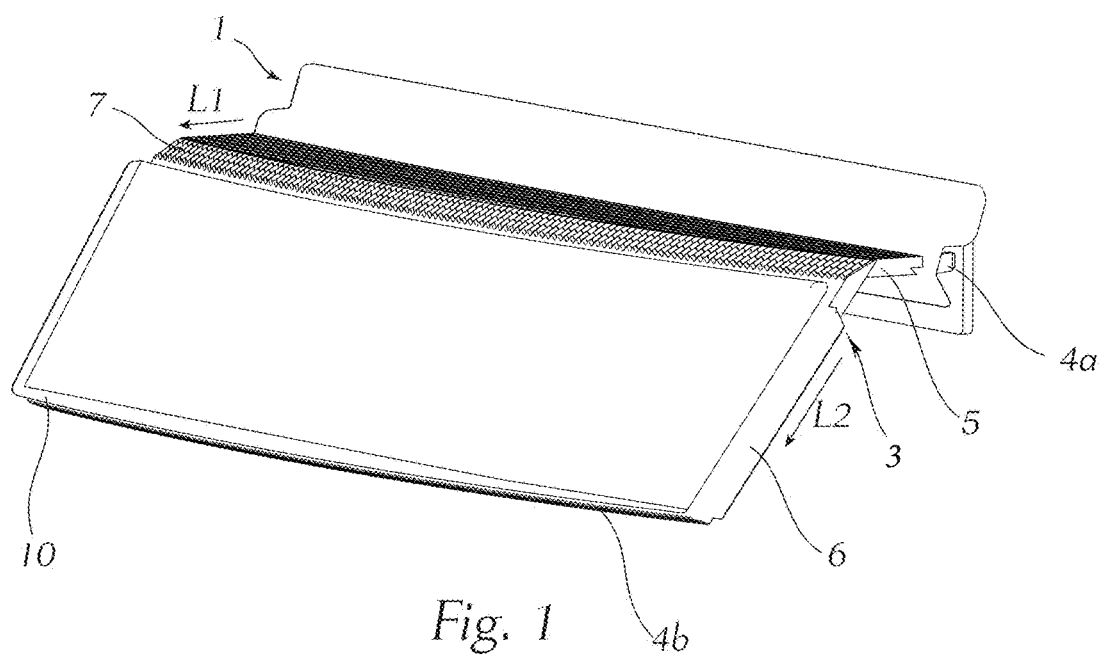
FIG. 1 shows a perspective view of an embodiment of a signal light or illumination device according to the invention.
Figure 2:
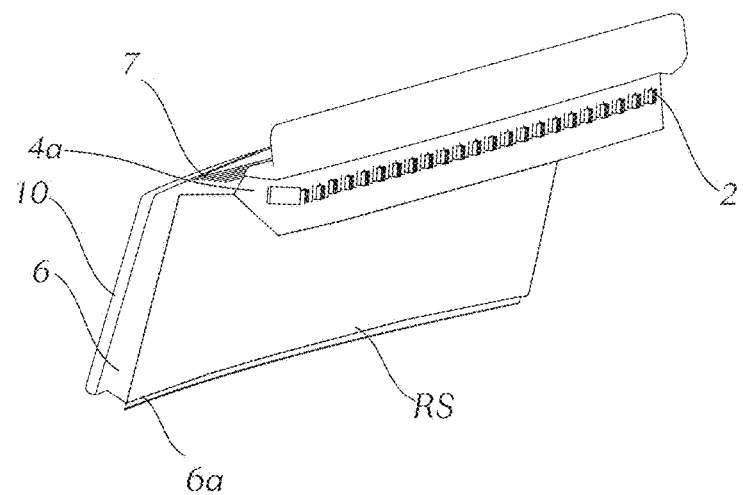
FIG. 2 shows a perspective rear view of the device according to FIG. 1.
Figure 3:
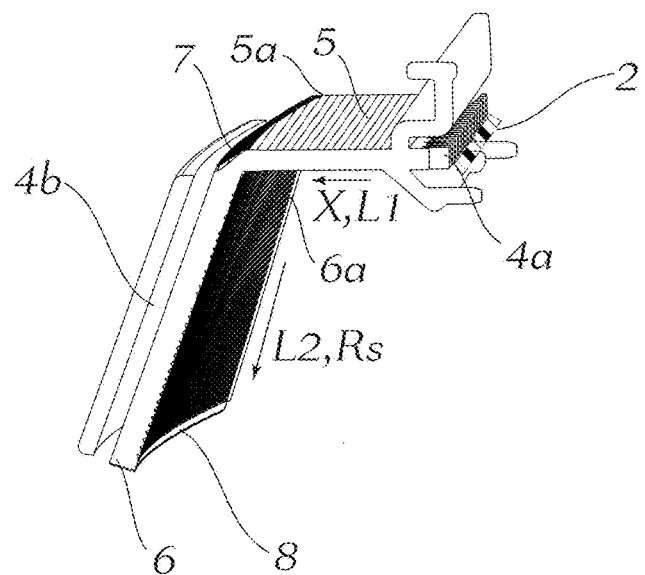
FIG. 3 shows a side view of the device according to FIG. 1.

FIG. 1, FIG. 2 and FIG. 3 show views of a signal light or illumination device 1 (hereinafter referred to as "device") for a motor vehicle or for a motor vehicle headlight.

The device 1 comprises at least one light source 2 for emitting light rays.

The device 1 further comprises a light guiding body 2 associated with the at least one light source 3. The light guiding body 3 is designed to receive light from the at least one light source via a light entry area 4a of the light guiding body 3, to guide it through the light guiding body and couple it out at a light extraction area 4b of the light guiding body 3 along a main emission direction x. The light guiding body 3 has a first section 5, a second section 6, and a first deflection element 7.

In the exemplary embodiment shown, the main emission direction x lies in a horizontal plane (when the signal light or illumination device is fitted to a motor vehicle or in a motor vehicle headlight).

The first section 5 is designed as a first light guiding channel, which is delimited by a first outer surface 5a and has a first longitudinal extension L1. In the exemplary embodiment shown, the first section 5 is designed in such a way that its first longitudinal extension L1 runs along the main emission direction x. The light entry area 4a is formed at an end of the first section 5 facing the at least one light source 2. The light entry area 4a is designed in such a way, for example in the form of a collimator, that the light rays emitted by the at least one light source 2 after entering the first section 5 are parallelized parallel to a first plane E1, and in particular are not parallelized along a second plane E2 which is different from the first plane E1, preferably orthogonal to the first plane E1, and propagate along the main emission direction x through the first section.

Figure 2A:
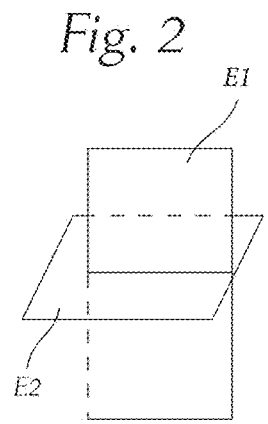
FIG. 2a shows a schematic view of two planes.

FIG. 2a shows an orientation of the planes E1 and E2 in relation to one another. The first plane E1 is orthogonal to the second plane E2, wherein the first plane E1 and the second plane E2 are respectively oriented parallel to the main emission direction x.

The second section 6 is also designed as a second light guiding channel, which is delimited by a second outer surface 6a and has a second longitudinal extension L2. The second section 6 is oriented to the first section 5 in such a way that its second longitudinal extension L2 runs along a second direction R2, which is oriented differently from the main emission direction x. The second outer surface 6a has a rear side RS and a front side VS opposite the rear side RS. The rear side RS has second deflection elements 8 along the second longitudinal extension L2 at least in sections. These are designed to deflect light, which propagates inside the second section 6 and strikes the second deflection elements 8, in the direction of the front side VS. One section of the front side VS, which in the exemplary embodiment shown is opposite the second deflection elements 8, forms the light extraction area 4b, via which light deflected by the second deflection elements 8 exits the second section 6 of the light guiding body 3, for example as a signal light function.

The first deflection element 7 connects the first section 5 to the second section 6 in a light-guiding manner and is designed to deflect light that has entered the first section 5, after it has passed through the first section 5, into the second section 6, in particular by means of total reflection, such that deflected light propagates inside the second section 6 along the second direction R2. In the exemplary embodiment shown, the first deflection element 7 is arranged at an end of the first section 5 facing away from the at least one light source 2. The first deflection element 7 can be designed as a totally reflecting mirror.

In the exemplary embodiment shown, the first section 5 is oriented to the second section 6 in such a way that the first longitudinal extension L1 of the first section 5 and the second longitudinal extension L2 of the second section 6 form an obtuse angle. This angle is greater than 90° and preferably smaller than 160°.

In the exemplary embodiment shown, the second deflection elements 8 are designed as a plurality of deflection prisms, which are arranged in a, preferably rectangular, grid on the rear side RS. Each deflection prism comprises a deflection surface designed to deflect light, preferably by means of total reflection, and at least one side surface, in particular two side surfaces. The deflection prisms are designed in such a way that the surface areas of the deflection surfaces increase along the second longitudinal extension and their side surfaces are oriented parallel to the second longitudinal extension L2 or to the second direction R2. The deflection prisms are further designed in such a way that their deflection surfaces respectively have a certain angle of inclination to a virtual rear side plane, which follows the rear side RS. The (virtual) rear side plane is oriented substantially parallel to the second longitudinal extension L2. The angles of inclination increase along the second longitudinal extension L2 in such a way that light rays deflected by the deflection prisms are oriented parallel to one another along the entire second longitudinal extension L2 after they have been deflected at the deflection surfaces. The increase in the deflection surface and angle of inclination along the second longitudinal extension L2 can result in particularly uniform light extraction from the second section 6.

Figure 4:
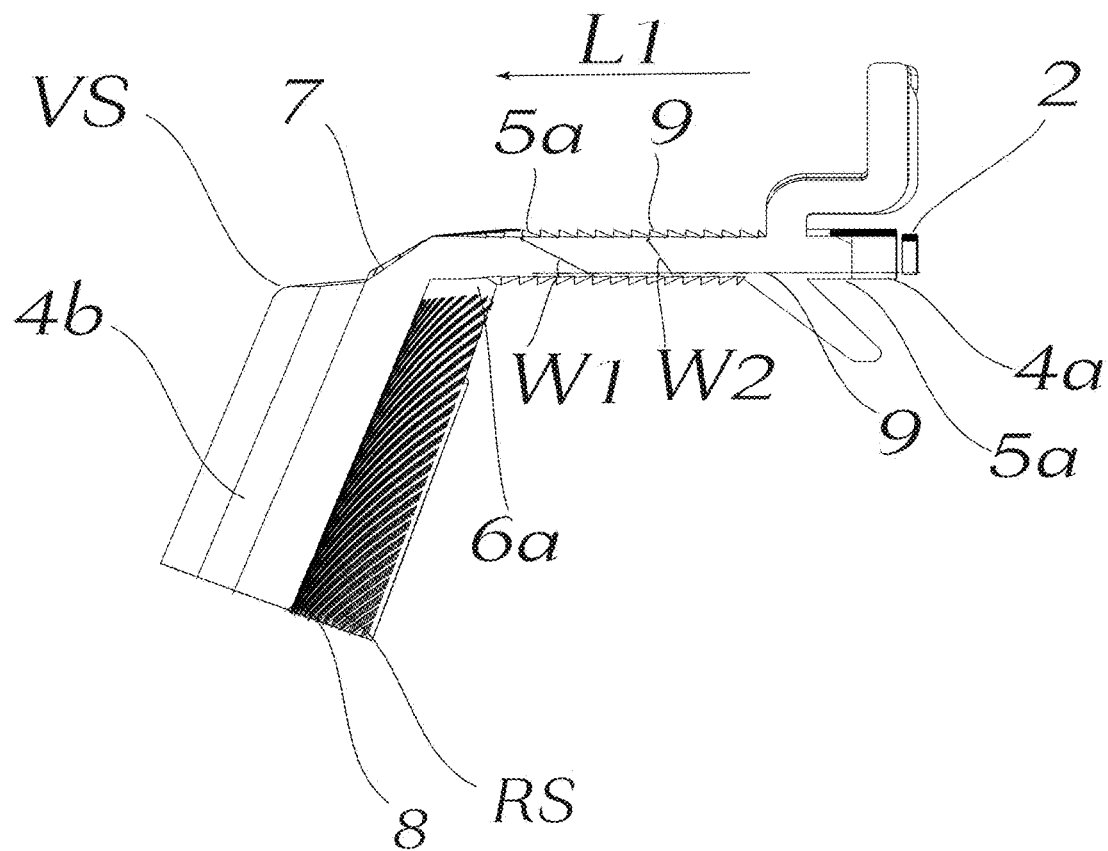
FIG. 4 shows a detail view of FIG. 3.

As shown in FIG. 4, the second section 6 is oriented to the first section 5 in such a way that the rear side RS of the second outer surface 6a faces the at least one light source 2 and the front side VS of the second outer surface 6a faces away from the at least one light source.

Figure 5:
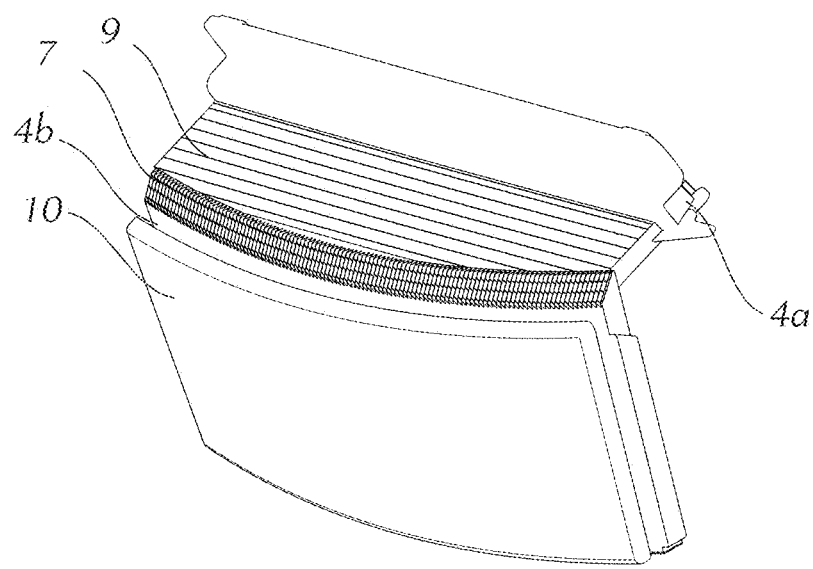
FIG. 5 shows a further perspective view of the device according to FIG. 1.

As shown in FIG. 5, the first section 5 and the second section 6 are respectively plate-like. A length and a width of the first section 5 lie in the plane E1. Wherein the plane E1 is parallel to the main emission direction x. A height of the first section 5 lies in the second plane E2 which is oriented orthogonal to the plane E1. The second section 6 extends along the second longitudinal extension L2 starting from an end face of the plate-like first section 5 facing away from the light source 2.

As shown in FIG. 3 and FIG. 4, the first outer surface 5a of the first light guiding channel has optical structures 9 along the first longitudinal extension L1 of the first section 5 at least in sections. These are designed to deflect light rays that have entered via the light entry area 4a.

The deflection by the optical structures 9 is such that light deflected by the optical structures 9, after it has been deflected by the first deflection element 7 in the direction of the second section 6, illuminates the second deflection elements 8 of the second section 6 substantially uniformly. This uniform lighting means that light exiting the extraction area 4a of the second section 6 has a substantially constant light intensity per exit surface unit over the entire extraction area 4a.

The optical structures 9 are designed to deflect light rays in such a way that light rays reflected by the optical structures 9 have an angle w1 to the main emission direction x which is smaller than an angle w2, which would exist between the main emission direction x and light rays, which would be reflected by a notional, smooth or flat outer surface 5a', which is free of optical structures 9.

The first outer surface 5a of the first section 5 has an upper side and a lower side opposite the upper side, wherein the optical structures 9 are arranged on the upper side and/or the lower side.

Figure 6:
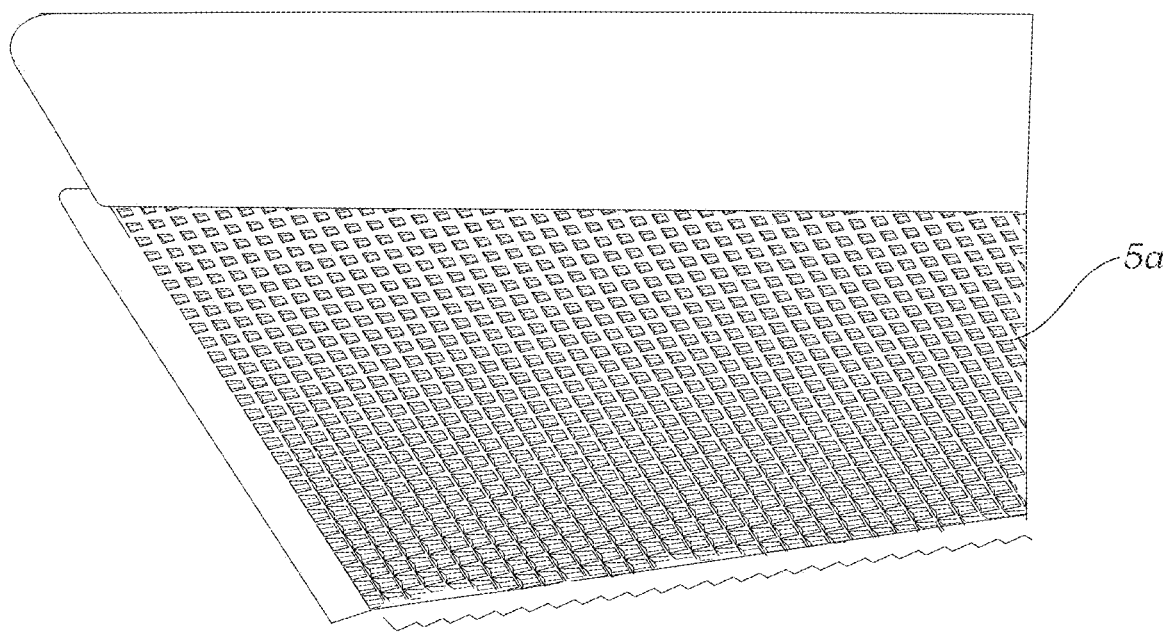
FIG. 6 shows a detail view of a first section.

As shown in FIG. 6, the optical structures 9 are designed as third deflection elements (in this example a plurality of deflection prisms or stepped deflection structures arranged in a grid), which are arranged along a section of the outer surface 5a along the main emission direction x. The third deflection elements are arranged at regular intervals or directly adjacent to one another on the outer surface 5a. The third deflection elements comprise respectively one, in particular flat, deflection surface for the deflection, in particular for the total reflection, of light. The deflection surfaces of the third deflection elements have a transverse extension orthogonal to the main emission direction x. Each deflection surface of a third deflection element is inclined to the main emission direction x such that in particular a surface vector of a deflection surface has an acute or obtuse angle to the main emission direction x.

In the exemplary embodiment shown, the first section 5 is designed integrally with the second section 6. The first section 5 is connected in a light-guiding manner to the second section 6 via a connection section of the light guiding body 3, wherein the connection section has the first deflection element 7. The first section 5 and the second section 6 are designed as light-guiding, preferably transparent, solid bodies.

The first section 5 and the second section 6 are designed and oriented to one another in such a way that light propagates in the first section 5 along the main emission direction x, and, after having been deflected by the first deflection element 7, light propagates in the second section 6 along a deflection direction, which forms an obtuse angle with the main emission direction x. The deflection direction is oriented along the second longitudinal extension L2. The second section 6 is designed in such a way that light exiting the light extraction area 4b of the second section 6 is oriented parallel again to the main emission direction x.

As shown in FIG. 5, a scattering element 10, preferably a diffusing lens, is provided, which is arranged along the main emission direction x downstream of the second section 6.

The scattering element 10 has a light entry surface facing the light extraction area 4b of the second section 6 and a light exit surface facing away from the light extraction area 4b of the second section 6. The scattering element 10 is designed to receive light exiting the light extraction area 4b of the second section 6 via the light entry surface and emit it as scattered, preferably diffuse, light via the light exit surface.

Figure 7:
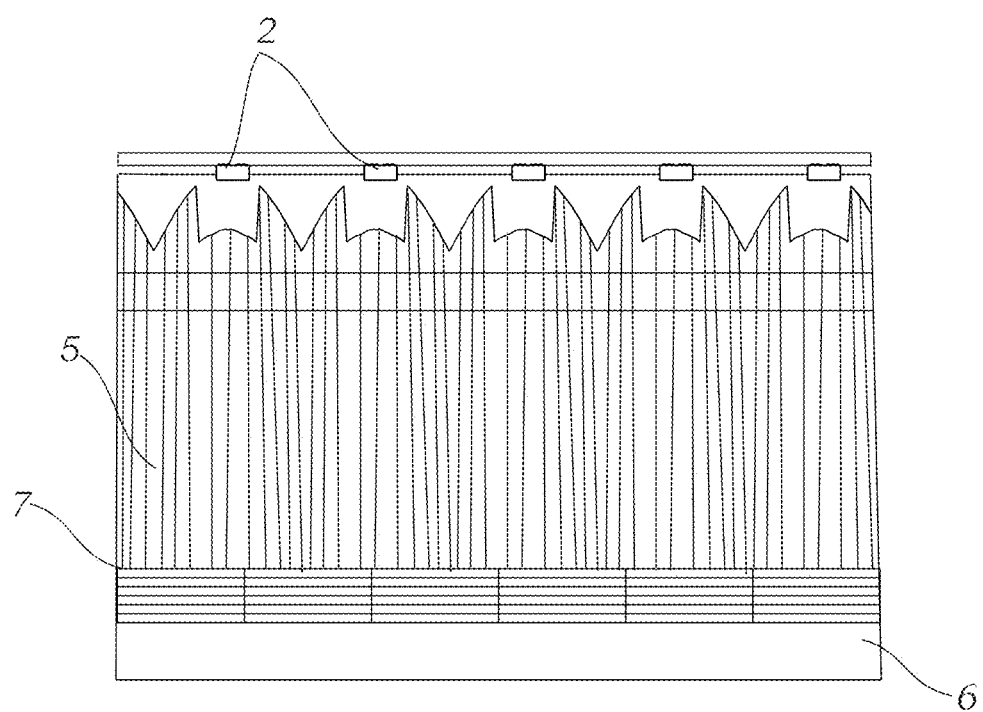
FIG. 7 shows a top view of a first section.

FIG. 7 shows a top view of the first selection 5, which lies parallel to the first plane E1 (not shown; cf. FIG. 2a). In the example shown, there are five light sources 2 (shown schematically by five rectangles), which are arranged next to one another in a row and feed light into the first section 5. The light sources are parallelized by five collimators (a collimator is associated with each light source 2) in the plane E1, which is a horizontal plane in the example shown (ideally all light sources are oriented completely parallel to one another; in FIG. 7, substantially parallelized light rays are shown schematically by vertical, approximately parallel lines; as there cannot be ideal or complete, perfect parallelization, the lines are not all exactly parallel; such imperfection is clear to a person skilled in the art). The horizontally parallelized light rays are deflected at the end of the first section 5 into the second section 6 by the deflection element 7. As the light rays travel through the first section 5, they are parallelized by the optical structures 9 in a vertical direction or the angles of the light rays are reduced relative to the main emission direction x, in a vertical plane, along the first longitudinal extension L1.

REFERENCE LIST 1 signal light or illumination device
2 light source
3 light guiding body
4a light entry area
4b light extraction area
5 first section
5a first outer surface
5a' notional outer surface
6 second section
6a second outer surface
7 first deflection element
8 second deflection element
9 optical structures
E1 first plane
E2 second plane
L1 first longitudinal extension L2 second longitudinal extension
R1 first direction
R2 second direction
RS rear side
VS front side
X main emission direction

The invention claimed is:

1. A signal light or illumination device (1) for a motor vehicle or for a motor vehicle headlight, comprising:
  at least one light source (2) for emitting light rays; and
  a light guiding body (3) associated with the at least one light source (2), wherein the light guiding body (3) is designed to receive light from the at least one light source via a light entry area (4a) of the light guiding body (3), to guide it through the light guiding body and couple it out at a light extraction area (4b) of the light guiding body (3) along a main emission direction (x),
  wherein the light guiding body (3) has a first section (5), a second section (6), and a first deflection element (7),
  wherein the first section (5) is designed as a first light guiding channel, which is delimited by a first outer surface (5a) and has a first longitudinal extension (L1), wherein the first section (5) is designed in such a way that its first longitudinal extension (L1) runs along the main emission direction (x), wherein the light entry area (4a) is formed at an end of the first section (5) facing the at least one light source (2), wherein the light entry area (4a) is designed in such a way that the light rays emitted by the at least one light source (2) after entering the first section (5) are parallelized parallel to a first plane (E1), and in particular are not parallelized along a second plane (E2) which is different from the first plane (E1), orthogonal to the first plane (E1), and propagate along the main emission direction (x) through the first section,
  wherein the second section (6) is designed as a second light guiding channel, which is delimited by a second outer surface (6a) and has a second longitudinal extension (L2), wherein the second section (6) is oriented to the first section (5) in such a way that its second longitudinal extension (L2) runs along a second direction (R2), which is oriented differently from the main emission direction (x), wherein the second outer surface (6a) has a rear side (RS) and a front side (VS) opposite the rear side (RS), wherein the rear side (RS) has second deflection elements (8) along the second longitudinal extension (L2) at least in sections, which are designed to deflect light, which propagates inside the second section (6) and strikes the second deflection elements (8), in the direction of the front side (VS), wherein one section of the front side (VS) forms the light extraction area (4b), via which light deflected by the second deflection elements (8) exits the second section (6) of the light guiding body (3),
  wherein the first deflection element (7) connects the first section (5) to the second section (6) in a light-guiding manner and is designed to deflect light that has entered the first section (5), after it has passed through the first section (5), into the second section (6), in particular by means of total reflection, such that deflected light propagates inside the second section (6) along the second direction (R2),
  wherein the first outer surface (5a) of the first light guiding channel has optical structures (9) along the first longitudinal extension (L1) of the first section (5) at least in sections, which are designed to deflect light rays that have entered via the light entry area (4a),
  wherein the deflection by the optical structures (9) is such that light deflected by the optical structures (9), after it has been deflected by the first deflection element (7) in the direction of the second section (6), illuminates the second deflection elements (8) of the second section (6) substantially uniformly in such a way that light exiting the extraction area (4a) of the second section (6) has a substantially constant light intensity per exit surface unit over the entire extraction area (4a),
  wherein the optical structures (9) are configured to deflect light rays in such a way that light rays reflected by the optical structures (9) have an angle (w1) to the main emission direction (x) which is smaller than an angle (w2), which would exist between the main emission direction (x) and light rays, which would be reflected by a notional, smooth or flat outer surface, which is free of optical structures (9), and
  wherein the optical structures (9) are designed as third deflection elements, which are arranged along a section of the outer surface (5a) along the main emission direction (x), wherein the third deflection elements have respectively one, flat deflection surface for the total reflection of light, wherein the deflection surfaces of the third deflection elements have in particular a transverse extension orthogonal to the main emission direction (x).

2. The signal light or illumination device (1) according to claim 1, wherein the first section (5) is oriented to the second section (6) in such a way that the first longitudinal extension (L1) of the first section (5) and the second longitudinal extension (L2) of the second section (6) form an obtuse angle, wherein the angle is more than 90°.

3. The signal light or illumination device (1) according to claim 2, wherein the obtuse angle is less than 160°.

4. The signal light or illumination device (1) according to claim 2, wherein the first deflection element (7) is arranged on an end of the first section (5) facing away from the at least one light source (2).

5. The signal light or illumination device (1) according to claim 1, wherein the second deflection elements (8) are cylindrical, wherein their cylinder axes extend on the rear side (RS) orthogonal to the main emission direction (x), and extend in particular orthogonal to the second longitudinal extension (L2) or to the second direction (R2), wherein the cylindrical second deflection elements (8) are designed to deflect light, which propagates inside the second section (6) and strikes the cylindrical second deflection elements (8), in the direction of the front side (VS).

6. The signal light or illumination device (1) according to claim 5, wherein the cylindrical second deflection elements (8) and the light extraction area (4b) are configured such that the deflected light rays are oriented parallel to the main emission direction (x) after exiting the second section (6).

7. The signal light or illumination device (1) according to claim 1, wherein the second deflection elements (8) are designed as a plurality of deflection prisms, which are arranged in a grid on the rear side (RS), wherein each deflection prism has a deflection surface designed to deflect light and at least one side surface wherein the deflection prisms are designed in such a way that the surface areas of the deflection surfaces increase along the second longitudinal extension (L2) and the at least one side surface is oriented parallel to the second longitudinal extension (L2) or to the second direction (R2), wherein the deflection prisms are designed in such a way that their deflection surfaces respectively have a certain angle of inclination to a virtual rear side plane, which follows the rear side (RS), wherein the rear side plane is oriented parallel to the second longitudinal extension (L2), wherein the angles of inclination increase along the second longitudinal extension (L2) in such a way that light rays deflected by the deflection prisms are oriented parallel to one another along the entire second longitudinal extension (L2) after they have been deflected at the deflection surfaces.

8. The signal light or illumination device (1) according to claim 7, wherein:
the grid is a rectangular grid,
each deflection prism has a deflection surface designed to deflect light by means of total reflection, and
the at least one side surface is two side surfaces.

9. The signal light or illumination device (1) according to claim 1, wherein the first outer surface (5a) of the first section (5) has an upper side and a lower side opposite the upper side, wherein the optical structures (9) are arranged on the upper side and/or the lower side.

10. The signal light or illumination device (1) according to claim 1, wherein the third deflection elements are a plurality of deflection prisms or stepped deflection structures arranged at regular intervals or directly adjacent to one another on the outer surface (5a).

11. The signal light or illumination device (1) according to claim 1, wherein the first section (5) and the second section (6) are respectively plate-like, wherein a length and a width of the first section (5) lie in the plane (E1) which is parallel to the main emission direction (x), and a height of the first section (5) lies in the second plane (E2) which is oriented orthogonal to the plane (E1).

12. The signal light or illumination device (1) according to claim 11, wherein the second section (6) extends along the second longitudinal extension (L2) starting from an end face of the plate-like first section (5) facing away from the light source (2).

13. The signal light or illumination device (1) according to claim 1, wherein the first deflection element (7) is designed for total reflection as a totally reflecting mirror, and is designed to deflect the light that has passed through the first section (5) into the second section (6).

14. The signal light or illumination device (1) according to claim 13, wherein the first deflection element (7) is designed to deflect the light that has passed through the first section (5) fully into the second section (6).

15. The signal light or illumination device (1) according to claim 1, wherein the first section (5) is designed integrally with the second section (6), wherein the first section (5) is connected in a light-guiding manner to the second section (6) via a connection section of the light guiding body (3), wherein the connection section has the first deflection element (7).

16. The signal light or illumination device (1) according to claim 15, wherein the first section (5) and the second section (6) are designed as light-guiding, transparent solid bodies.

17. The signal light or illumination device (1) according to claim 1, wherein the first section (5) and the second section (6) are designed and oriented to one another in such a way that light propagates in the first section (5) along the main emission direction (x), and, after having been deflected by the first deflection element (7), light propagates in the second section (6) along a deflection direction, which forms an obtuse angle with the main emission direction (x), wherein the deflection direction is oriented along the second longitudinal extension (L2), wherein the second section (6) is designed in such a way that light exiting the light extraction area (4b) of the second section (6) is oriented parallel to the main emission direction (x).

18. The signal light or illumination device (1) according to claim 1, wherein the main emission direction (x) lies in a horizontal plane when the signal light or illumination device is fitted to a motor vehicle or in a motor vehicle headlight.

19. The signal light or illumination device (1) according to claim 1, comprising a plurality of light sources (2) arranged one next to the another along a width, which is oriented orthogonal to the main emission direction (x), wherein the light entry area (4a) of the first section (5) has a plurality of collimators, wherein a light source (2) is associated with each collimator.

20. The signal light or illumination device (1) according to claim 1, comprising a scattering element (10), which is arranged along the main emission direction (x) downstream of the second section (6), wherein the scattering element (10) has a light entry surface facing the light extraction area (4b) of the second section (6) and a light exit surface facing away from the light extraction area (4b) of the second section (6), wherein the scattering element (10) is designed to receive light exiting the light extraction area (4b) of the second section (6) via the light entry surface and emit it as scattered light via the light exit surface.

21. The signal light or illumination device (1) according to claim 20, wherein the scattering element (10) is a diffusing lens and designed to receive light exiting the light extraction area (4b) of the second section (6) via the light entry surface and emit it as diffuse light via the light exit surface.

22. A motor vehicle or motor vehicle headlight, comprising the signal light or illumination device according to claim 1.

23. The signal light or illumination device (1) according to claim 1, wherein the light entry area (4a) is in the form of a collimator.

24. The signal light or illumination device (1) according to claim 1, wherein each deflection surface of a third deflection element is inclined to the main emission direction (x).

25. The signal light or illumination device (1) according to claim 1, wherein the one section of the front side (VS) is opposite the second deflection elements (8), forms the light extraction area (4b), via which light deflected by the second deflection elements (8) exits the second section (6) of the light guiding body (3).

26. The signal light or illumination device (1) according to claim 25, wherein the light deflected by the second deflection elements (8) exits the second section (6) of the light guiding body (3) as a signal light function.

* * * * *